(No Model.) 2 Sheets—Sheet 1.
C. E. BRENNAN.
COMBINED SINGLE AND TANDEM BICYCLE.
No. 569,705. Patented Oct. 20, 1896.
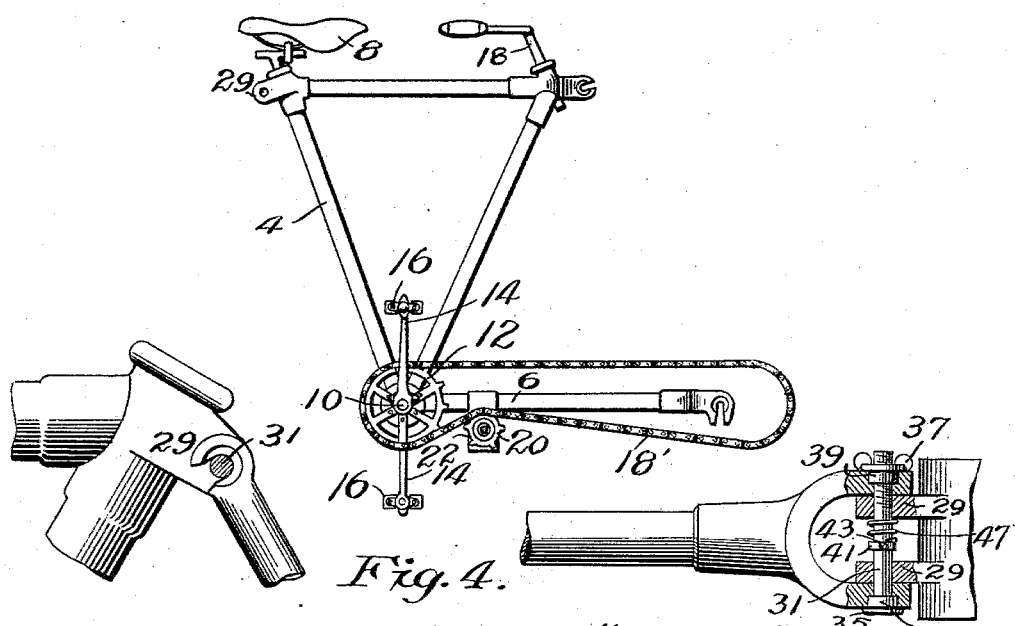
Fig. 4. Fig. 5.
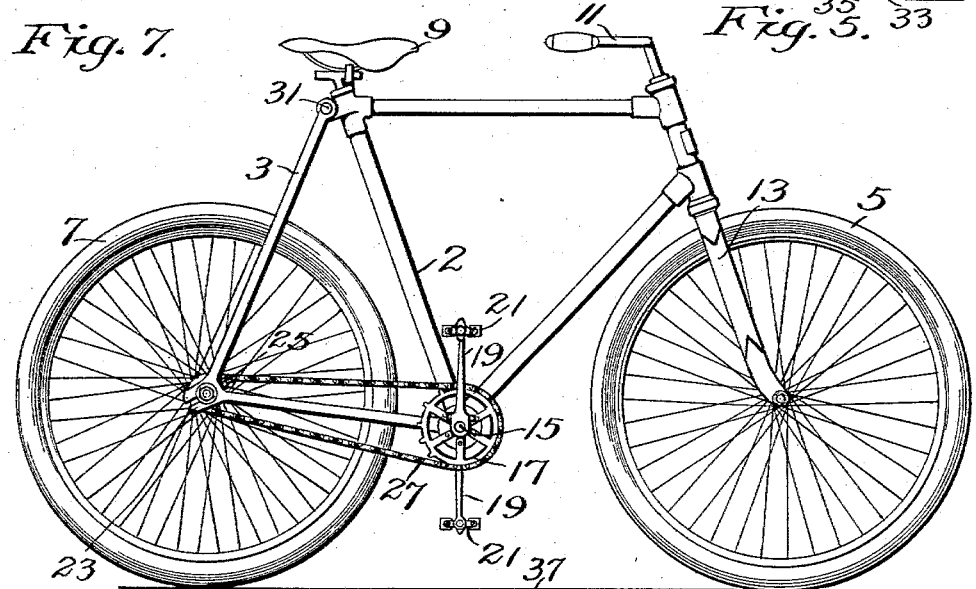
Fig. 7.
Fig. 1.
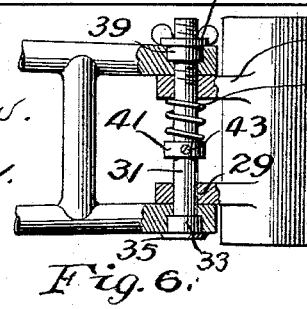
Fig. 6.
Witnesses:
C. E. VanDorn.
W. E. Gooley.
Inventor:
Charles E. Brennan.
By Paul & Hawley
his Attorneys.

(No Model.) 2 Sheets—Sheet 2.
C. E. BRENNAN.
COMBINED SINGLE AND TANDEM BICYCLE.
No. 569,705. Patented Oct. 20, 1896.
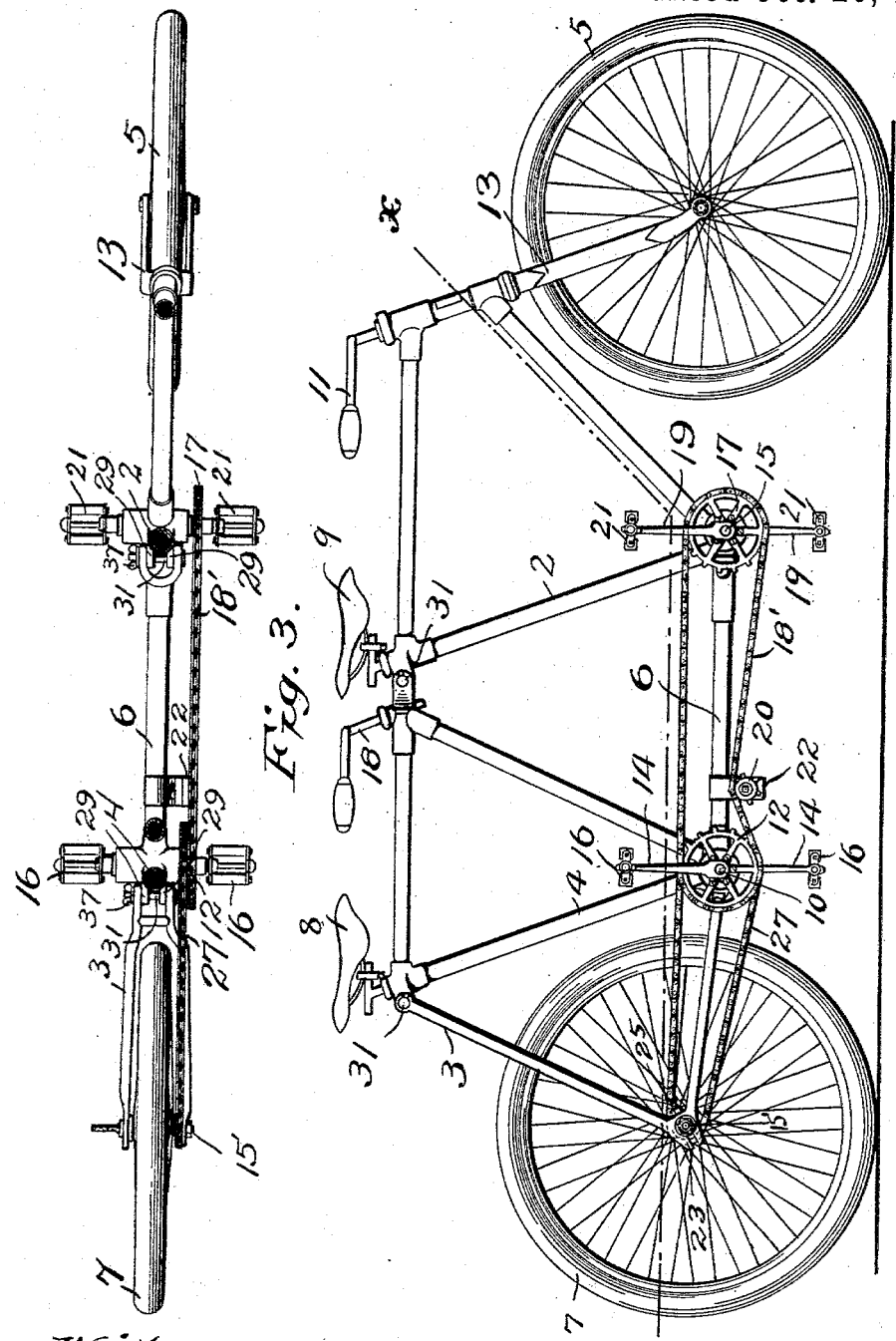
Witnesses:
C. E. Van Dorn.
W. E. Gooley.
Inventor:
Charles E. Brennan.
By Paul & Hawley
his Attorneys.

UNITED STATES PATENT OFFICE.

CHARLES E. BRENNAN, OF MINNEAPOLIS, MINNESOTA.

COMBINED SINGLE AND TANDEM BICYCLE.

SPECIFICATION forming part of Letters Patent No. 569,705, dated October 20, 1896.

Application filed April 18, 1895. Serial No. 546,167. (No model.)

*To all whom it may concern:*

Be it known that I, CHARLES E. BRENNAN, of the city of Minneapolis, county of Hennepin, State of Minnesota, have invented certain new and useful Improvements in a Combined Single and Tandem Bicycle, of which the following is a specification.

The object of this invention is to provide a bicycle which may be used as an ordinary single bicycle, and which, when so used, will have the appearance of an ordinary bicycle, and which is constructed and arranged to be converted readily into a tandem bicycle, or as readily converted back again into a single bicycle.

The invention consists generally in a bicycle having a separable frame, with a supplemental or auxiliary frame adapted to be connected thereto, of the construction and combination of parts hereinafter described, and particularly pointed out in the claims.

The invention will be more readily understood by reference to the accompanying drawings, forming part of this specification, and in which—

Figure 1 is a side elevation of my improved bicycle adapted for use as a single bicycle. Fig. 2 is a similar view showing it converted into a tandem bicycle. Fig. 3 is a section on the line $x\ x$ of Fig. 2. Fig. 4 is a side elevation of the auxiliary or supplemental frame. Figs. 5, 6, and 7 are details showing the preferable construction of the connections between the parts of the main frame and the supplemental frame.

The frame of the bicycle is constructed in two parts when the bicycle is used single, and when it is to be converted into a tandem bicycle the two parts of the frame are separated and the supplemental frame is arranged between them, and this supplemental frame combines with the two parts of the single frame so as to form a continuous tandem frame. The supplemental frame carries a suitable saddle and also a crank-shaft with a double sprocket-wheel, to which connection is made from the sprocket-wheel on the forward crank-shaft and to the rear or driving wheel.

In the drawings, 2 represents the forward, and 3 the rear, section of the main frame of the bicycle, which is of course provided with any suitable wheels 5 and 7. The forward section 2 of the main frame is provided with any suitable saddle 9, handle-bar 11, and fork 13. Said parts are connected to the forward wheel 5 in any usual or preferred manner. This section of the frame is also provided with a suitable crank-shaft 15, carrying a sprocket-wheel 17 and provided with the usual cranks 19 and pedals 21. All of these parts may be of any suitable or preferred construction. The rear section 3 of the main frame consists of a V-shaped frame made double to straddle the rear wheel and provided at the apex of the V with a slot 23, by which it is connected to the rear axle in the ordinary manner. This frame is also provided with a suitable adjusting-screw 25, by means of which the tension upon the chain extending to the rear wheel may be regulated by adjusting the position of the axle relatively to the slot in the frame 3. A chain 27 passes around the sprocket on the axle 15 and around a suitable gear upon the axle of the rear wheel. The rear section 3 is connected to the forward section 2 by means which permits said sections to be readily disconnected one from the other. Any preferred means may be used for making this connection between the two sections of the frame, though I prefer the means hereinafter described.

An independent or supplemental section 4 is provided that is adapted to be inserted between the two sections 2 and 3 of the main frame, thus converting the bicycle from a single, such as shown in Fig. 1, to a double or tandem, as shown in Fig. 2. This section is preferably a frame of substantially triangular form provided with the horizontally-projecting bar 6 at its lower portion and carrying a suitable saddle 8 at the top. This section has mounted in suitable bearings at the lower portion thereof a crank-shaft 10, provided with a double sprocket-wheel 12 and with suitable cranks 14 and pedals 16. The section is also preferably provided with a suitable handle-bar 18. When the bicycle is changed to a tandem, the supplemental frame-section is inserted, as shown in Fig. 2, and the driving-chain 27 is in that instance run from the rear wheel to one part of the double sprocket 12. A chain 18' extends from the other part of the double sprocket to the sprocket 17 upon the front section 2 of the frame. A suitable idler 20, mounted upon a sliding block 22, arranged upon the bar 6, is preferably provided to operate as a tightener for the chain 18'. When it is desired to restore the bicycle to its normal position, the supplemental section 4 is removed and the sections 2 and 3 are again connected together and the chain 27 is made to connect the sprocket 17 with the gear upon the shaft of the rear wheel.

Any preferred construction and arrangement may be used for connecting the sections together. I prefer to provide the section 2 with the lugs 29, through which extends a bolt 31. This bolt is provided with an enlarged cylindrical portion 33 below the head 35, and the opposite end of the bolt, which is screw-threaded, is provided with a thumb-nut 37, also having a cylindrical portion 39 below the bearing-surface of the nut, said cylindrical portion being preferably a counterpart of the cylindrical portion 33 upon the bolt 31. The bolt 31 passes through both of the lugs 29. A collar 41 is arranged thereon, being secured thereto by a suitable set-screw 43 or by other suitable means, and a spring 47 is arranged upon said bolt between the collar 41 and the inner surface of the lug 29 nearest the threaded end of the bolt. By this means the bolt is always held in position when the parts are separated. The lower branch of the second section 3 of the frame is provided with a slot in each part thereof similar to that shown in the end of the bar 6 in Fig. 4. The inner end of said slot forms a bearing for the said section of said frame upon the bolt 31, and a countersunk recess is formed in each part of said section concentric with the inner end of the said slot to receive the cylindrical portion 33 of the bolt 31 and the part 39 of the nut 37.

In connecting the two sections of the frame together, the nut 37 being loosened from the bolt 31, the bolt is pushed backward by the spring 47, so that the end of the section may be readily hooked over the small portion of the bolt, then the bolt is pushed forward, the cylindrical enlargement 33 entering the countersunk recess in the section, and the nut 37 being screwed to place, bringing the cylindrical projection 39 into the countersunk recess in the other part of the section. These parts absolutely prevent the section from being disconnected from the bolt until the nut is loosened and the bolt pushed back so as to bring the smallest portion of the bolt in such position that the section may be unhooked therefrom. A similar connection is made in the other member of the section 3 with the upper part of the section 2, as shown in Fig. 1. The bar 6 upon the supplemental section 4 and the upper forward end of said section are provided with slotted bearings similar to those in the section 3, so that when the section 3 is removed from the section 2, the section 4 may be connected to the section 2 by the same lugs and bolts that were formerly used to connect the section 3 to the section 2, then the rear upper and lower portions of the section 4 are provided with lugs and bolts corresponding to those already described as being provided upon the section 2, and the section 3 is then by this means connected to the rear portion of the section 4. It is necessary before putting the frame together to properly connect the driving-chains, and the bicycle is then adapted for use as a tandem. By reversing this operation the bicycle is reconverted into a single bicycle.

It will be understood that I do not confine myself to the particular shape or construction of the sections of the main frame or of the supplemental frame, as these may be varied without departing from my invention, as, for instance, where a woman's bicycle is to be made a suitable change in the shape of the section 2 of the main frame and of the supplemental frame will be made, the difference in shape of these parts of the frame being obtained by the omission or depression of the upper horizontal bar of the frame in a manner corresponding to that usually adopted in the construction of a woman's bicycle.

If preferred, the supplemental frame-section may be jointed for the purpose of folding it up or taking it apart. The usual tandem connection may be made between the front and rear handles, if preferred.

Having thus described my invention, I claim as new and desire to secure by Letters Patent—

1. A bicycle-frame, comprising forward and rear sections whereto the wheels are attached, said forward section comprising a standard 2, a head and parts connecting the same, said rear section comprising the back and horizontal bars, said sections adapted to be secured to one another, and an independent middle section adapted to be inserted between the forward and rear sections, said middle section comprising upright or standard parts, and upper and lower horizontal sections, seats carried upon the forward and middle sections, and suitable driving mechanisms also carried thereon, substantially as described.

2. A bicycle-frame, comprising two independent forward and rear sections, means for detachably securing said sections together at their upper and lower parts, a middle independent section adapted to be inserted between said forward and rear sections, and comprising the V-shaped portions 4 and the horizontal part 6, means for clamping said middle section to said forward and rear sections, said clamping means consisting of the lugs provided on the forward and middle sections, bolts adapted to pass through said lugs, and the slotted ends of the adjacent section, said bolts being provided with the collar 41, the spring 47 and the thumb-nut 37, substantially as described and for the purpose specified.

3. The combination, in a bicycle-frame, of the section provided with the lugs 29, the bolt 31 extending through said lugs and provided with the enlarged cylindrical portion 33, the collar 41 upon said bolt, the spring 47 engaging said collar and engaging one of said lugs, the nut 37 provided with the enlarged cylindrical portion 39, and the frame-section provided with slots arranged to engage said bolt and having cylindrical recesses into which the enlarged portions 33 and 39 upon said bolt and nut respectively engage, for the purpose specified.

4. A bicycle-frame, comprising forward and rear sections whereto the wheels are attached, said forward section comprising a standard 2, a head and parts connecting the same, said rear section comprising the back fork and lower parts, said sections adapted to be secured to one another, and an independent middle section adapted to be inserted between said forward and rear sections, said middle section comprising the upright or standard parts, and a lower horizontal section whereby the lower parts of the forward and rear sections are connected, seats carried respectively upon one of the main sections and upon said independent section, and a suitable driving mechanism also carried thereon, substantially as described.

In testimony whereof I have hereunto set my hand this 15th day of April, A. D. 1895.

CHARLES E. BRENNAN.

In presence of—
  A. C. PAUL,
  RICHARD PAUL.